(12) United States Patent
Makkar et al.

(10) Patent No.: US 8,171,064 B2
(45) Date of Patent: May 1, 2012

(54) METHODS AND SYSTEMS FOR CONCURRENTLY READING DIRECT AND INDIRECT DATA BLOCKS

(75) Inventors: Gaurav Makkar, Bangalore (IN); Timothy C. Bisson, Fremont, CA (US)

(73) Assignee: NetApp, Inc., Sunnyvale, CA (US)

( * ) Notice: Subject to any disclaimer, the term of this patent is extended or adjusted under 35 U.S.C. 154(b) by 261 days.

(21) Appl. No.: 12/552,216

(22) Filed: Sep. 1, 2009

(65) Prior Publication Data
US 2011/0055261 A1 Mar. 3, 2011

(51) Int. Cl.
G06F 17/30 (2006.01)
G06F 15/16 (2006.01)

(52) U.S. Cl. .................. 707/822; 707/802; 709/203

(58) Field of Classification Search .......... 707/822, 707/770, 802; 709/203
See application file for complete search history.

(56) References Cited

U.S. PATENT DOCUMENTS

| | | | | |
|---|---|---|---|---|
| 6,138,126 A * | 10/2000 | Hitz et al. | .................. | 1/1 |
| 6,571,259 B1 * | 5/2003 | Zheng et al. | .................. | 1/1 |
| 6,640,233 B1 * | 10/2003 | Lewis et al. | .................. | 1/1 |
| 6,868,417 B2 * | 3/2005 | Kazar et al. | .................. | 1/1 |
| 6,895,413 B2 * | 5/2005 | Edwards | .................. | 1/1 |
| 6,983,296 B1 * | 1/2006 | Muhlestein et al. | .......... | 707/705 |
| 7,028,071 B1 | 4/2006 | Slik | | |
| 7,043,485 B2 * | 5/2006 | Manley et al. | ............. | 707/658 |
| 7,072,910 B2 * | 7/2006 | Kahn et al. | ................ | 707/639 |
| 7,107,385 B2 * | 9/2006 | Rajan et al. | ................ | 711/4 |
| 7,171,469 B2 | 1/2007 | Ackaouy et al. | | |
| 7,191,290 B1 | 3/2007 | Ackaouy et al. | | |
| 7,249,150 B1 * | 7/2007 | Watanabe et al. | ............. | 1/1 |
| 7,284,030 B2 | 10/2007 | Ackaouy et al. | | |
| 7,546,486 B2 | 6/2009 | Slik et al. | | |
| 7,552,223 B1 | 6/2009 | Ackaouy et al. | | |
| 7,590,672 B2 | 9/2009 | Slik et al. | | |
| 2003/0195903 A1 * | 10/2003 | Manley et al. | ................ | 707/201 |
| 2005/0033748 A1 * | 2/2005 | Kazar et al. | .................... | 707/10 |
| 2008/0005206 A1 * | 1/2008 | Rajakarunanayake | ........ | 707/205 |
| 2008/0077762 A1 * | 3/2008 | Scott et al. | .................... | 711/170 |
| 2010/0057791 A1 * | 3/2010 | Schneider | .................... | 707/205 |
| 2010/0121825 A1 * | 5/2010 | Bates et al. | ................... | 707/692 |

OTHER PUBLICATIONS

Fu, Kevin, et al., "Fast and Secure Distributed Read-Only File System", ACM Transactions on Computer Systems, vol. 20, No. 1, Feb. 2002, pp. 1-24.*
Liu, Jingning, et al., "SDBIA: A Novel Approach to Improve the Reading Performance of Large Objects for Object-based Storage Device", FCST 2007, Wuhan, China, Nov. 1-3, 2007, pp. 114-118.*
McDonald, Andrew D., et al., "StegFS: A Steganographic File System for Linux", IH '99, LNCS 1768, Springer-Verlag, Berlin, Germany, © 2000, pp. 463-477.*
Microsoft Computer Dictionary, 5th Edition, Microsoft Press, Redmond, WA, © 2002, pp. 346 and 474.*

* cited by examiner

Primary Examiner — Robert Stevens
(74) Attorney, Agent, or Firm — Perkins Coie LLP

(57) ABSTRACT

Methods and systems for concurrently reading direct and indirect data blocks of a data object stored in a network storage server system. In one embodiment, upon receiving a request to read a data object, the storage server identifies a location of an indirect data-block of the data object and a total number of direct data-blocks associated with the data object. Using this information, the storage server concurrently reads, using a single read operation, both the indirect data-block and a specific number of data blocks that are contiguous with the location of the indirect data-block. The specific number is commensurate with the total number of direct-data blocks associated with the data object. In one embodiment, the storage server verifies whether the data object is represented using a contiguous-mode layout scheme before performing the concurrent single-read operation to read the data object.

16 Claims, 10 Drawing Sheets

METHODS AND SYSTEMS FOR CONCURRENTLY READING DIRECT AND INDIRECT DATA BLOCKS

FIELD OF THE INVENTION

At least one embodiment of the present invention pertains to network storage systems, and more particularly, to methods and systems for concurrently reading direct and indirect data-blocks of a data object.

BACKGROUND

Network based storage, or simply "network storage", is a common approach to backing up data, making large amounts of data accessible to multiple users, and other purposes. In a network storage environment, a storage server makes data available to client (host) systems by presenting or exporting to the clients one or more logical containers of data (or simply, "data objects"). There are various forms of network storage, including network attached storage (NAS) and storage area network (SAN). In a NAS context, a storage server services file-level requests from clients, whereas in a SAN context a storage server services block-level requests. Some storage servers are capable of servicing both file-level requests and block-level requests.

There are several trends that are relevant to network storage technology. The first is that the amount of data being stored within a typical enterprise is approximately doubling from year to year. Second, the number of clients that the storage server can serve simultaneously has also been steadily increasing. As a result of the increase in stored data and the increase in the number of clients accessing the stored data, a vast majority of the storage server's computing resources is allocated to servicing, for example, read and write requests received from the clients.

In traditional storage systems, the storage server stores data pertaining to each data object (e.g., a file) in the form of multiple "direct" data-blocks that contain the actual user data of the data object. The storage server typically uses a hierarchical structure (e.g., a buffer tree) that uses multiple levels of data-blocks to represent each data object. For example, "indirect" data-blocks in a buffer tree associated with a data object typically include pointers for locating direct data-blocks of the data object at a lower level of the buffer tree.

As a result of the multiple levels of hierarchy, a traditional storage server commonly uses multiple read operations (i.e., multiple I/O operations) to read a data object. For example, when a data object is represented using two levels of hierarchy (i.e., a first level containing indirect data-blocks and a second level that contains direct data-blocks), the storage server uses two read operations: a first read operation to read the indirect data-blocks (to identify the location of the direct-data blocks), and a second read operation to read the second level direct data-blocks. These multiple read operations for reading a data object significantly consume processing resources of the storage server, which can significantly impact performance, especially in a system that has a heavy read workload.

SUMMARY

Introduce herein are methods and systems for concurrently reading direct and indirect data blocks of a data object stored in a network storage server system. In one embodiment, upon receiving a request to read a data object, the storage server identifies a location of an indirect data-block of the data object and a total number of direct data-blocks associated with the data object. Using this information, the storage server concurrently reads, using a single read operation, both the indirect data-block and a specific number of direct data blocks that are contiguous with the location of the indirect data-block. The specific number is commensurate with the total number of direct-data blocks associated with the data object. In one embodiment, the storage server verifies whether the data object is represented using a contiguous-mode layout scheme before performing the concurrent single-read operation to read the data object. Accordingly, the storage server reduces the overall number of read operations required to read certain data objects (e.g., data objects that are represented using a contiguous-mode layout scheme), thereby improving the operating efficiency of the storage server.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Figure 1:
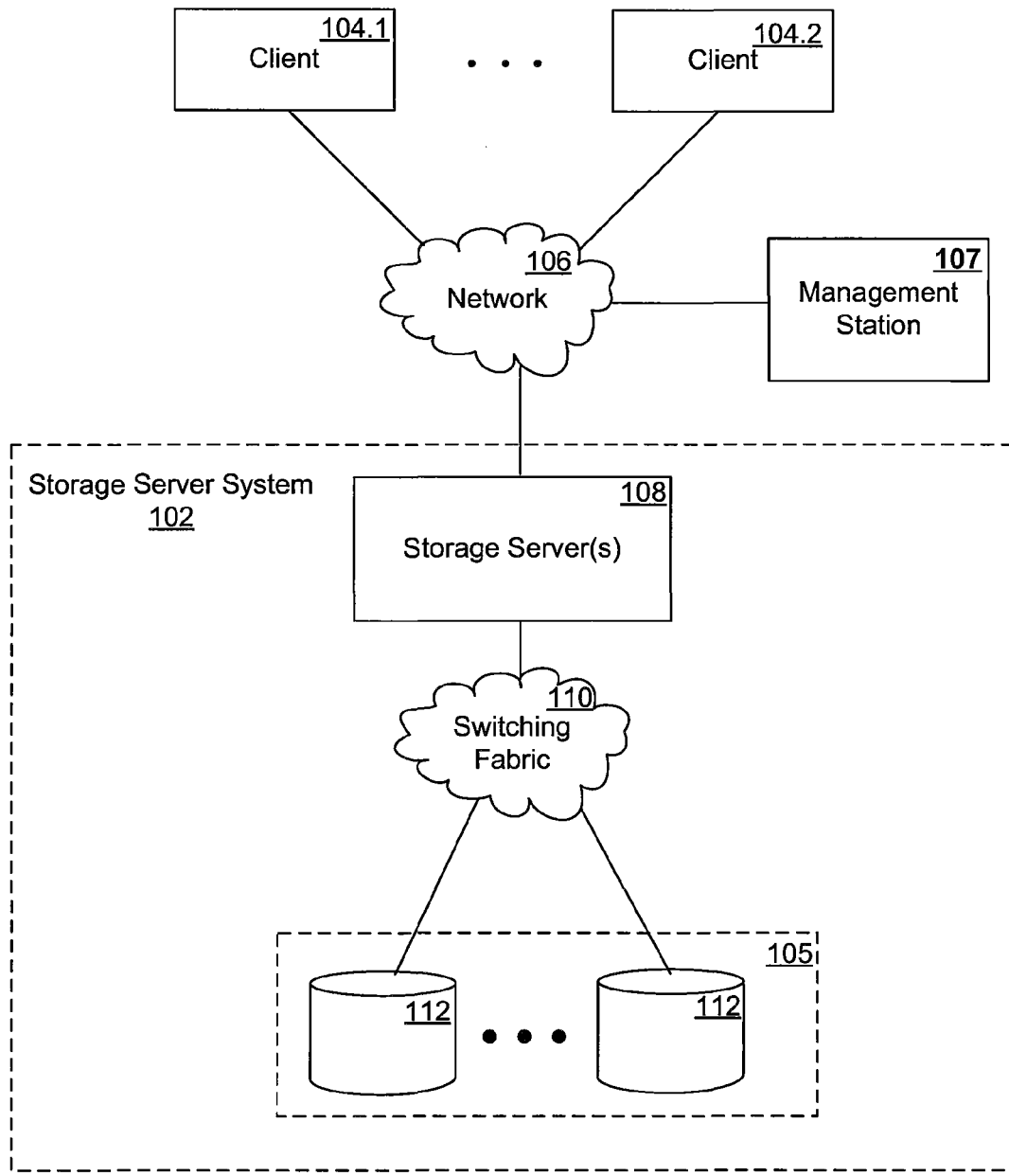
FIG. 1 illustrates a network storage environment in which the present invention can be implemented.
Figure 2:
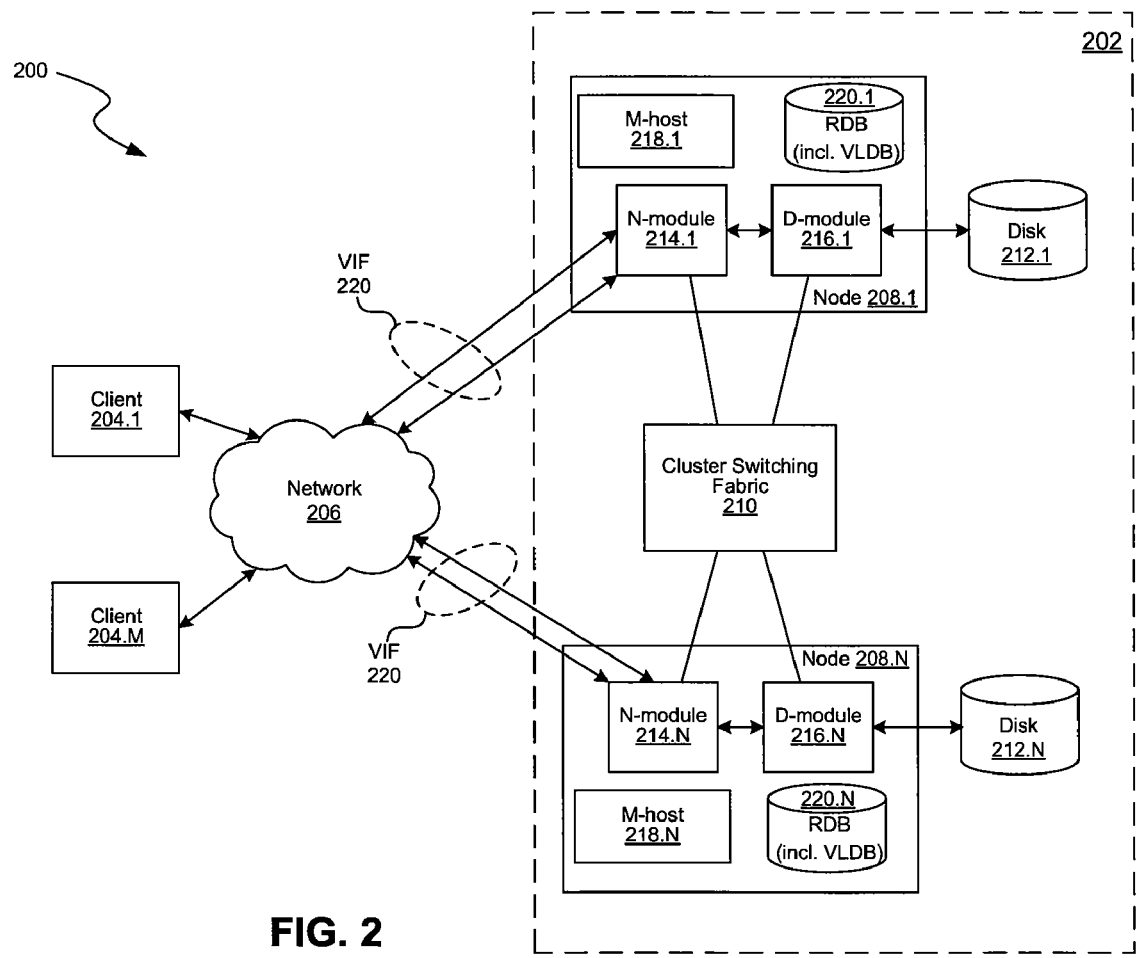
FIG. 2 illustrates a clustered network storage environment in which the present invention can be implemented.

FIGS. 1 and 2 show, at different levels of detail, a network configuration in which the techniques introduced here can be implemented. It is noted that the clustered environment described here is for illustration of one type of a configuration in which the techniques can be implemented, and that other network storage configurations that support the "contiguous-mode layout scheme" can be used for implementing the techniques.

FIG. 1 shows a network data storage environment, which includes a plurality of client systems 104.1-104.2, a storage server system 102, and computer network 106 connecting the client systems 104.1-104.2 and the storage server system 102. As shown in FIG. 1, the storage server system 102 includes at least one storage server 108, a switching fabric 110, and a number of mass storage devices 112, such as disks, in a mass storage subsystem 105. Alternatively, some or all of the mass storage devices 212 can be other types of storage, such as flash memory, solid-state drives (SSDs), tape storage, etc.

The storage server (or servers) 108 may be, for example, one of the FAS-xxx family of storage server products available from NetApp, Inc. The client systems 104.1-104.2 are connected to the storage server 108 via the computer network 106, which can be a packet-switched network, for example, a local area network (LAN) or wide area network (WAN). Further, the storage server 108 is connected to the disks 112 via a switching fabric 110, which can be a fiber distributed data interface (FDDI) network, for example. It is noted that, within the network data storage environment, any other suitable numbers of storage servers and/or mass storage devices, and/or any other suitable network technologies, may be employed.

The storage server 108 can make some or all of the storage space on the disk(s) 112 available to the client systems 104.1-104.2 in a conventional manner. For example, each of the disks 112 can be implemented as an individual disk, multiple disks (e.g., a RAID group) or any other suitable mass storage device(s). The storage server 108 can communicate with the client systems 104.1-104.2 according to well-known protocols, such as the Network File System (NFS) protocol or the Common Internet File System (CIFS) protocol, to make data stored on the disks 112 available to users and/or application programs. The storage server 108 can present or export data stored on the disk 112 as volumes to each of the client systems 104.1-104.2. A "volume" is an abstraction of physical storage, combining one or more physical mass storage devices (e.g., disks) or parts thereof into a single logical storage object (the volume), and which is managed as a single administrative unit, such as a single file system. A "file system" is a structured (e.g., hierarchical) set of stored data objects. A "data object," as indicated herein, refers to logical containers of data (e.g., volumes, logical unit numbers (LUNs), directories, files). Note that a "file system" does not have to include or be based on "files" per se as its units of data storage.

Various functions and configuration settings of the storage server 108 and the mass storage subsystem 105 can be controlled from a management station 107 coupled to the network 106. Among many other operations, a data object migration operation can be initiated from the management station 107.

FIG. 2 depicts a network data storage environment, which can represent a more detailed view of the environment in FIG. 1. The environment 200 includes a plurality of client systems 204 (204.1-204.M), a clustered storage server system 202, and a computer network 206 connecting the client systems 204 and the clustered storage server system 202. As shown in FIG. 2, the clustered storage server system 202 includes a plurality of server nodes 208 (208.1-208.N), a cluster switching fabric 210, and a plurality of mass storage devices 212 (212.1-212.N), which can be disks, as henceforth assumed here to facilitate description. Alternatively, some or all of the mass storage devices 212 can be other types of storage, such as flash memory, SSDs, tape storage, etc.

Each of the nodes 208 is configured to include several modules, including an N-module 214, a D-module 216, and an M-host 218 (each of which may be implemented by using a separate software module) and an instance of, for example, a replicated database (RDB) 220. Specifically, node 208.1 includes an N-module 214.1, a D-module 216.1, and an M-host 218.1; node 208.N includes an N-module 214.N, a D-module 216.N, and an M-host 218.N; and so forth. The N-modules 214.1-214.M include functionality that enables nodes 208.1-208.N, respectively, to connect to one or more of the client systems 204 over the network 206, while the D-modules 216.1-216.N provide access to the data stored on the disks 212.1-212.N, respectively. The M-hosts 218 provide management functions for the clustered storage server system 202. Accordingly, each of the server nodes 208 in the clustered storage server arrangement provides the functionality of a storage server.

The RDB 220 is a database that is replicated throughout the cluster, i.e., each node 208 includes an instance of the RDB 220. The various instances of the RDB 220 are updated regularly to bring them into synchronization with each other. The RDB 220 provides cluster-wide storage of various information used by all of the nodes 208, including a volume location database (VLDB) (not shown). The VLDB is a database that indicates the location within the cluster of each volume in the cluster (i.e., the owning D-module 216 for each volume) and is used by the N-modules 214 to identify the appropriate D-module 216 for any given volume to which access is requested.

The nodes 208 are interconnected by a cluster switching fabric 210, which can be embodied as a Gigabit Ethernet switch, for example. The N-modules 214 and D-modules 216 cooperate to provide a highly-scalable, distributed storage system architecture of a clustered computing environment implementing exemplary embodiments of the present invention. Note that while there is shown an equal number of N-modules and D-modules in FIG. 2, there may be differing numbers of N-modules and/or D-modules in accordance with various embodiments of the technique described here. For example, there need not be a one-to-one correspondence between the N-modules and D-modules. As such, the description of a node 208 comprising one N-module and one D-module should be understood to be illustrative only.

Figure 3:
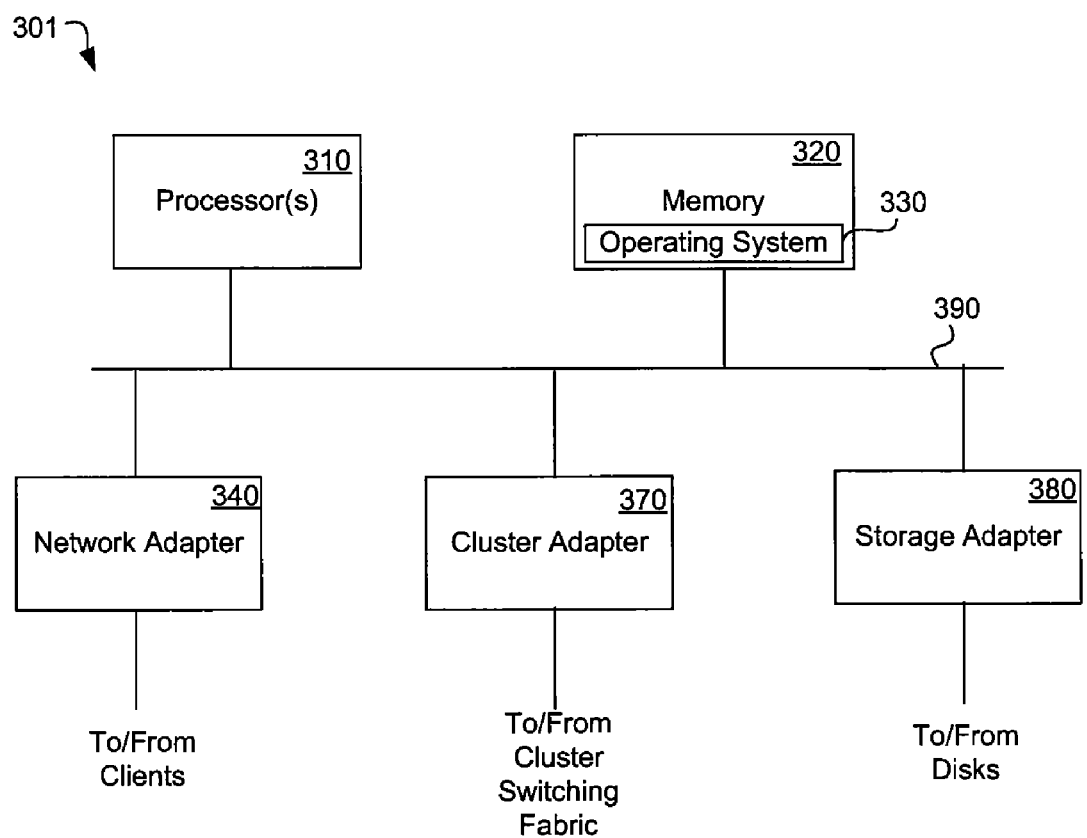
FIG. 3 is a high-level block diagram showing an example of the hardware architecture of a storage controller that can implement one or more storage server nodes.

FIG. 3 is a diagram illustrating an example of a storage controller that can implement one or more of the storage server nodes 208. In an exemplary embodiment, the storage controller 301 includes a processor subsystem that includes one or more processors. The storage controller 301 further includes a memory 320, a network adapter 340, a cluster access adapter 370 and a storage adapter 380, all interconnected by an interconnect 390. The cluster access adapter 370 includes a plurality of ports adapted to couple the node 208 to other nodes 208 of the cluster. In the illustrated embodiment, Ethernet is used as the clustering protocol and interconnect media, although other types of protocols and interconnects may be utilized within the cluster architecture described herein. In alternative embodiments where the N-modules and D-modules are implemented on separate storage systems or computers, the cluster access adapter 270 is utilized by the N-module 214 and/or D-module 216 for communicating with other N-modules and/or D-modules of the cluster.

The storage controller 301 can be embodied as a single- or multi-processor storage system executing a storage operating system 330 that preferably implements a high-level module, such as a storage manager, to logically organize the information as a hierarchical structure of named directories, files and special types of files called virtual disks (hereinafter generally "blocks") on the disks. Illustratively, one processor 310 can execute the functions of the N-module 214 on the node 208 while another processor 310 executes the functions of the D-module 216.

The memory 320 illustratively comprises storage locations that are addressable by the processors and adapters 340, 370, 380 for storing software program code and data structures associated with the present invention. The processor 310 and adapters may, in turn, comprise processing elements and/or logic circuitry configured to execute the software code and manipulate the data structures. The storage operating system 330, portions of which is typically resident in memory and executed by the processors(s) 310, functionally organizes the storage controller 301 by (among other things) configuring the processor(s) 310 to invoke storage operations in support of the storage service provided by the node 208. It will be apparent to those skilled in the art that other processing and memory implementations, including various computer readable storage media, may be used for storing and executing program instructions pertaining to the technique introduced here.

The network adapter 340 includes a plurality of ports to couple the storage controller 301 to one or more clients 204 over point-to-point links, wide area networks, virtual private networks implemented over a public network (Internet) or a shared local area network. The network adapter 340 thus can include the mechanical, electrical and signaling circuitry needed to connect the storage controller 301 to the network 206. Illustratively, the network 206 can be embodied as an Ethernet network or a Fibre Channel (FC) network. Each client 204 can communicate with the node 208 over the network 206 by exchanging discrete frames or packets of data according to pre-defined protocols, such as TCP/IP.

The storage adapter 380 cooperates with the storage operating system 330 to access information requested by the clients 204. The information may be stored on any type of attached array of writable storage media, such as magnetic disk or tape, optical disk (e.g., CD-ROM or DVD), flash memory, solid-state disk (SSD), electronic random access memory (RAM), micro-electro mechanical and/or any other similar media adapted to store information, including data and parity information. However, as illustratively described herein, the information is stored on disks 212. The storage adapter 380 includes a plurality of ports having input/output (I/O) interface circuitry that couples to the disks over an I/O interconnect arrangement, such as a conventional high-performance, Fibre Channel (FC) link topology.

Storage of information on disks 212 can be implemented as one or more storage volumes that include a collection of physical storage disks cooperating to define an overall logical arrangement of volume block number (VBN) space on the volume(s). The disks 212 can be organized as a RAID group. One or more RAID groups together form an aggregate. An aggregate can contain one or more volumes/file systems.

The storage operating system 330 facilitates clients' access to data stored on the disks 212. In certain embodiments, the storage operating system 330 implements a write-anywhere file system that cooperates with one or more virtualization modules to "virtualize" the storage space provided by disks 212. In certain embodiments, a storage manager 460 (FIG. 4) logically organizes the information as a hierarchical structure of named directories and files on the disks 212. Each "on-disk" file may be implemented as set of disk blocks (or, data blocks) configured to store information, such as data, whereas the directory may be implemented as a specially formatted file in which names and links to other files and directories are stored. The virtualization module(s) allow the storage manager 460 to further logically organize information as a hierarchical structure of blocks on the disks that are exported as named logical unit numbers (LUNs).

In the illustrative embodiment, the storage operating system 330 is a version of the Data ONTAP® operating system available from NetApp, Inc. and the storage manager 460 implements the Write Anywhere File Layout (WAFL®) file system. However, other general or special purpose operating systems are capable of being enhanced or created for use in accordance with the principles described herein.

Figure 4:
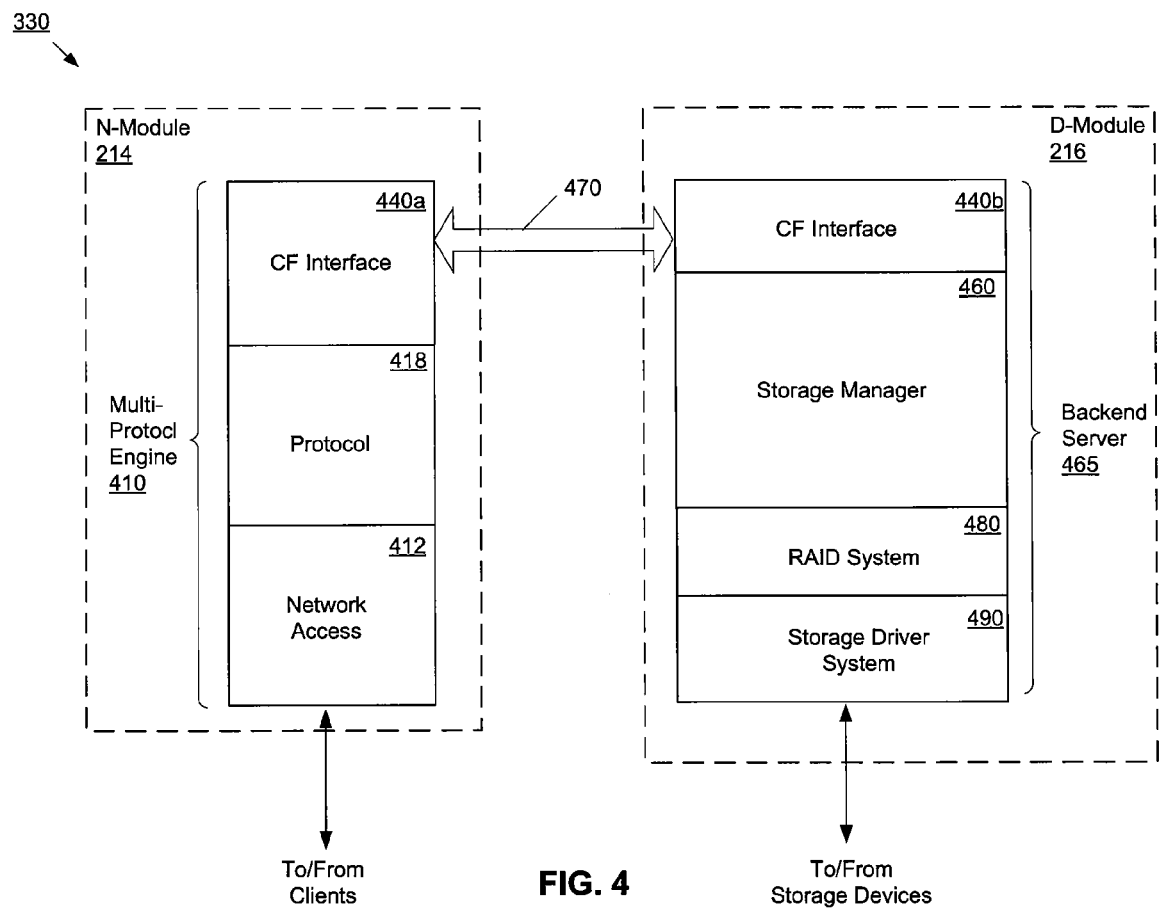
FIG. 4 illustrates an example of a storage operating system of a storage server node.

FIG. 4 is a diagram illustrating an example of storage operating system 330 that can be used with the technique introduced here. In the illustrated embodiment the storage operating system 330 includes multiple functional layers organized to form an integrated network protocol stack or, more generally, a multi-protocol engine 410 that provides data paths for clients to access information stored on the node using block and file access protocols. The multiprotocol engine 410 in combination with underlying processing hardware also forms the N-module 214. The multi-protocol engine 410 includes a network access layer 412 which includes one or more network drivers that implement one or more lower-level protocols to enable the processing system to communicate over the network 206, such as Ethernet, Internet Protocol (IP), Transport Control Protocol/Internet Protocol (TCP/IP), Fibre Channel Protocol (FCP) and/or User Datagram Protocol/Internet Protocol (UDP/IP). The multiprotocol engine 410 also includes a protocol layer which implements various higher-level network protocols, such as Network File System (NFS), Common Internet File System (CIFS), Hypertext Transfer Protocol (HTTP), Internet small computer system interface (iSCSI), etc. Further, the multi-protocol engine 410 includes a cluster fabric (CF) interface module 440a which implements intra-cluster communication with D-modules and with other N-modules.

In addition, the storage operating system 330 includes a set of layers organized to form a backend server 465 that provides data paths for accessing information stored on the disks 212 of the node 208. The backend server 465 in combination with underlying processing hardware also forms the D-module 216. To that end, the backend server 465 includes a storage manager module 460 that manages any number of volumes 472, a RAID system module 480 and a storage driver system module 490. At least one of the volumes 472 includes at least one qtree 475 and at least one standard directory 474.

The storage manager 460 primarily manages a file system (or multiple file systems) and serves client-initiated read and write requests. The RAID system 480 manages the storage and retrieval of information to and from the volumes/disks in accordance with a RAID redundancy protocol, such as RAID-4, RAID-5, or RAID-DP, while the disk driver system 490 implements a disk access protocol such as SCSI protocol or FCP.

The backend server 465 also includes a CF interface module 440b to implement intra-cluster communication 470 with N-modules and/or other D-modules. The CF interface modules 440a and 440b can cooperate to provide a single file system image across all D-modules 216 in the cluster. Thus, any network port of an N-module 214 that receives a client request can access any data container within the single file system image located on any D-module 216 of the cluster.

The CF interface modules 440 implement the CF protocol to communicate file system commands among the modules of cluster over the cluster switching fabric 210 (FIG. 2). Such communication can be effected by a D-module exposing a CF application programming interface (API) to which an N-module (or another D-module) issues calls. To that end, a CF interface module 440 can be organized as a CF encoder/decoder. The CF encoder of, e.g., CF interface 440a on N-module 214 can encapsulate a CF message as (i) a local procedure call (LPC) when communicating a file system command to a D-module 216 residing on the same node or (ii) a remote procedure call (RPC) when communicating the command to a D-module residing on a remote node of the cluster. In either case, the CF decoder of CF interface 440b on D-module 216 de-encapsulates the CF message and processes the file system command.

In operation of a node 208, a request from a client 204 is forwarded as a packet over the network 206 and onto the node 208, where it is received at the network adapter 340 (FIG. 3). A network driver of layer 412 processes the packet and, if appropriate, passes it on to a network protocol and file access layer for additional processing prior to forwarding to the storage manager 460. At that point, the storage manager 460 generates operations to load (retrieve) the requested data from disk 212 if it is not resident in memory 320. If the information is not in memory 320, the storage manager 460 indexes into a metadata file to access an appropriate entry and retrieve a logical VBN. The storage manager 460 then passes a message structure including the logical VBN to the RAID system 480; the logical VBN is mapped to a disk identifier and disk block (or data block) number (DBN) and sent to an appropriate driver (e.g., SCSI) of the disk driver system 490. The disk driver accesses the DBN from the specified disk 212 and loads the requested data block(s) in memory for processing by the node. Upon completion of the request, the node (and operating system) returns a reply to the client 204 over the network 206.

The data request/response "path" through the storage operating system 330 as described above can be implemented in general-purpose programmable hardware executing the storage operating system 330 as software or firmware. Alternatively, it can be implemented at least partially in specially designed hardware. That is, in an alternate embodiment of the invention, some or all of the storage operating system 330 is implemented as logic circuitry embodied within a field programmable gate array (FPGA) or an application specific integrated circuit (ASIC), for example.

The N-module 214 and D-module 216 each can be implemented as processing hardware configured by separately-scheduled processes of storage operating system 330; however, in an alternate embodiment, the modules may be implemented as processing hardware configured by code within a single operating system process. Communication between an N-module 214 and a D-module 216 is thus illustratively effected through the use of message passing between the modules although, in the case of remote communication between an N-module and D-module of different nodes, such message passing occurs over the cluster switching fabric 210. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF API.

Figure 5:
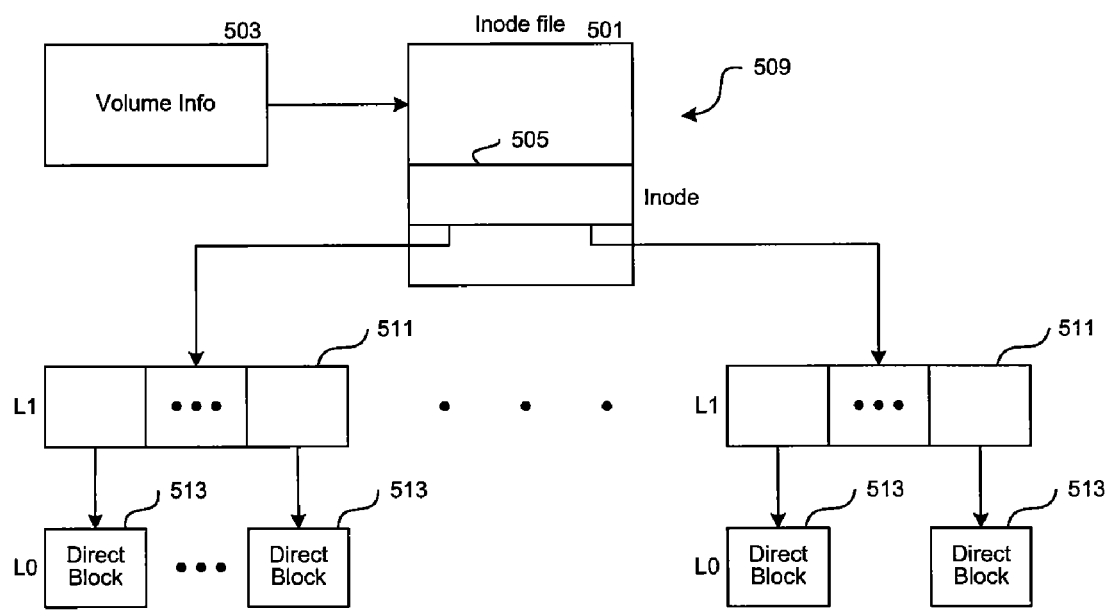
FIG. 5 shows an example of a buffer tree for a data object.

It is useful now to consider how data can be structured and organized by the storage server system 102. Reference is now made to FIG. 5 in this regard. In certain embodiments, a data object (e.g., a file) is represented in a storage server system 102 in the form of a hierarchical structure called a "buffer tree". A buffer tree is a hierarchical structure which is used to store data pertaining to a data object as well as metadata about the data object, including pointers for use in locating the data blocks for the data object. A buffer tree includes one or more levels of indirect data-blocks (called "L1 blocks", "L2 blocks", etc.), each of which contains one or more pointers to lower-level indirect blocks and/or to the direct data-blocks (called "L0 blocks") of the data object. In other words, the indirect data-blocks provide a reference to the physical location (or physical address) of each of the direct data-blocks. All of the data in the data object is stored only at the lowest level (L0) data-blocks (i.e., the direct data-blocks) of a storage container.

The root of a buffer tree is the "inode" of the data object. An inode is a metadata container that is used to store metadata about the file, such as ownership, access permissions, file size, file type, and pointers to the highest level of indirect blocks for the data object. Each data object has its own inode. The inode is stored in a separate inode file, which may itself be structured as a buffer tree.

FIG. 5 shows an example of a buffer tree 509 for a data object. The data object is assigned an inode 505, which references Level 1 (L1) indirect blocks 511. Each indirect block 511 stores two or more pointers to a lower-level block, e.g., a direct-block 513. Each pointer in an L1 and indirect block 511 references a physical block 513 in a storage device (i.e., in the aggregate).

For each volume managed by the storage server 108, the inodes of the data objects in that volume are stored in a separate inode file, such as inode file 501 in FIG. 5 which stores inode 505. A separate inode file is maintained for each volume. The location of the inode file for each volume is stored in a Volume Information ("VolumeInfo") block associated with that volume, such as VolumeInfo block 503 in FIG. 5.

The above description provided a general illustration of a storage server system that may be used for implementing the techniques described herein. The following sections provide a description of methods and systems by which read operations may be optimized in a storage server system.

In some instances, depending on the storage size of the data object, the direct data-blocks corresponding to the data object may not be stored contiguously (i.e., the direct data-blocks may be scattered in different locations of the storage container). In such instances, the storage server 108 relies on the information available through the indirect data-block(s) to identify the direct data-blocks that are scattered in different locations of the storage container. Consider, for example, a digital document that is of a size that requires storage using 5000 direct data-blocks. Owing to the large number of direct data-blocks, the storage server may allocate 100 blocks of the digital document in one location of the storage container, allocate another 100 blocks in a different (non-contiguous) location of the storage server, and so on. Also, because of such effects as disk defragmentation, the storage container may have a few "empty" data-blocks scattered in different locations. As part of disk usage optimization, the storage server may allocate the data-blocks of the digital document to the first available 5000 data-blocks that may be scattered at different locations of the storage container.

In such instances, when a request to read a data object is received, the storage server 108 uses a first read operation to read one or more indirect data-blocks associated with the data object. As indicated above, each indirect data-block provides references to the location of the underlying direct data-blocks. The storage server 108 identifies the location of the direct data-blocks using the first read operation. The storage server 108 then uses a second read operation to read the direct data-blocks that were identified using the first read operation. Accordingly, in such instances, the storage server 108 uses two read (I/O) operations to read the data object.

However, in some instances, the file system arranges the direct-data blocks sequentially, especially when the overall storage size of the data object is less than a specific value. One known example of such a file system allows the direct data-blocks to be arranged sequentially when the storage size of the data object is less than or equal to 256 KB. Furthermore, in such instances, the file system places an indirect data-block of the data object contiguously with the sequentially arranged direct data-blocks (that is referenced by the indirect data-block) of the data object.

As will be explained in detail below, a data object conforming to such a layout scheme can be read using just a single read operation (i.e., by reading both the indirect data block and the direct data blocks of the data object concurrently in a single read operation). This type of a concurrent single-read operation is particularly beneficial in a network storage system that has a substantial number of "small" data objects (i.e., data objects that have a storage size less than or equal to the size required for conformity with the above indicated layout scheme), where the read time for reading such data objects is approximately halved, thereby decreasing output latency and increasing operating efficiency of the network storage system. In other embodiments, the techniques indicates herein do not have to be limited to a data object conforming to a contiguous-mode layout scheme or to a data object that is lesser than a certain size.

Consider the example of a storage container used by Internet-hosted photo sharing application. Such a storage container would have a large number of "small" sized photos. Typically, a photo is written once, but may be read by users several times (i.e., the photo gets read every time someone accesses a photo through the photo sharing application). By using the "concurrent single-read operation" technique described herein, the read time to read the photos is approximately halved (because each read is done using a single read operation instead of using two separate read operations), thereby allowing the photos to be retrieved at a faster rate, and improving the overall performance of the storage system for read workloads.

It is noted that the technique described herein may be extended to any file system implementation that uses a "contiguous-mode layout scheme" for data objects. A "contiguous-mode layout scheme," as indicated herein, refers to a physical storage layout of a data object where the direct data-blocks of the data object are arranged sequentially and are contiguous with an indirect data-block of the data object.

Figure 6:
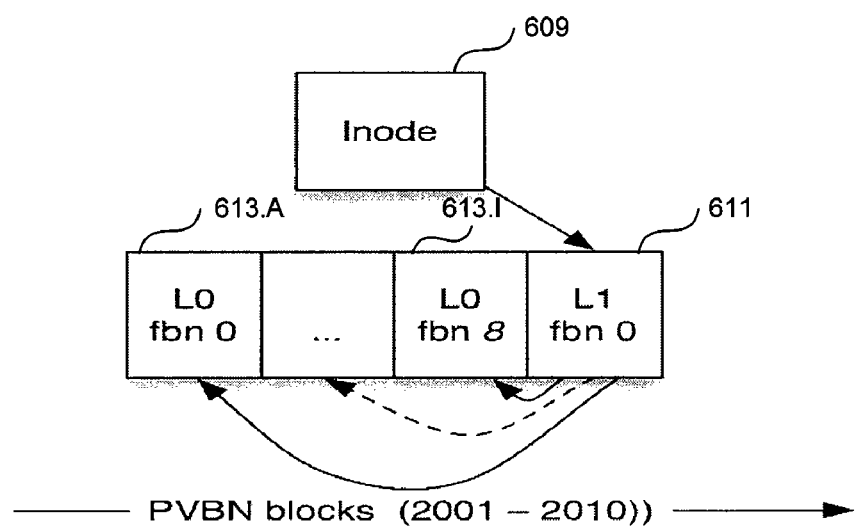
FIG. 6 illustrates a contiguous-mode layout scheme of a data object.

Now refer to FIG. 6, which illustrates a contiguous-mode layout scheme of a data object. In the illustrated example, it is assumed that the storage size of the data object is such that the data object can be implemented using the contiguous-mode layout scheme (e.g., a storage size of less than or equal to 256 KB). As indicated above, the root of the buffer tree representing the data object is an inode 609. The inode 609 provides a reference to identify a location of an indirect data-block 611 associated with the data object. The indirect data-block contains references to direct data-blocks (e.g., 613A) associated with the data object.

As illustrated in FIG. 6, the direct data-blocks associated with the data object are arranged sequentially. That is, the nine direct data-blocks (613.A-613.1) are stored in consecutive physical addresses of the storage container. For example, direct data-block 613.A is stored in physical volume block number (PVBN) "2001" of the storage container, direct data-block 613.B (now shown in FIG. 6) is stored in PVBN "2002" of the storage container, and so on. Additionally, the contiguous-mode layout scheme allows for an indirect data-block associated with the data object to be placed contiguously with either the tail-end or the head-end of the sequentially arranged direct data-blocks. In the example illustrated in FIG. 6, the indirect data-block 611 is placed at the tail end of the sequentially arranged direct data-blocks (i.e., at PVBN "2010").

The following description describes techniques for using a concurrent single-read operation to read a data object, implemented in a network storage server system 202 such as described above. In at least one embodiment, the storage server 202 takes advantage of the contiguous-mode layout scheme of the data object to perform the concurrent single-read operation.

Figure 7:
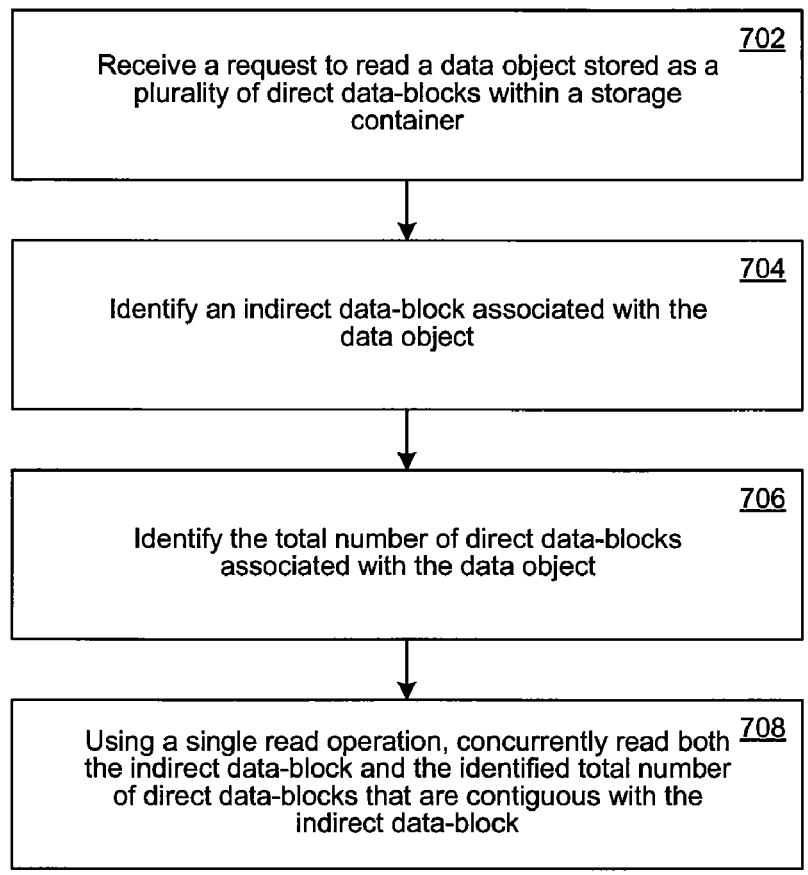
FIG. 7 is a flow diagram showing an example of a concurrent single-read operation of a data object.

Refer now to FIG. 7, which is a flow diagram showing an example of a concurrent single-read operation of a data object. At 702, the storage server 202 receives a request to read a data object stored in a storage container. In one example, the storage server 202 may receive such a request from a storage client 204. As indicated above, the data object is stored (i.e., represented) in the storage container in the form of multiple direct data-blocks and at least one indirect data block. In the example of FIG. 7, it is assumed that the storage size of the data object is less than or equal to a value that allows a layout of the data object to conform to the contiguous-mode layout scheme (e.g., less than or equal to 256 KB).

At 704, the storage server 202 identifies a location of an indirect data-block associated with the data object. In some instances, the storage server 202 uses an inode associated with the data object to identify the location of the indirect data block. Additionally, at 706, the storage server 202 identifies the total number (i.e., a count value) of direct data blocks that are associated with the data object. Again, in some instances, the storage server 202 uses information stored in the inode of the data object to identify the total number. Subsequently, at 708, the storage server 202 utilizes the identified information (i.e., location of the indirect data-block, total number of direct data-blocks) to concurrently read, in a single read-operation, both the indirect data-block and the multiple direct data-blocks.

In one embodiment, the storage server 202 performs the concurrent single-read operation by concurrently reading both the indirect data-block (at the location identified using the inode) and a specific number of data-blocks that are contiguous with the identified indirect data-block. The specific number is commensurate with the total number of direct data-blocks (that was previously identified using the inode). Using this technique, the storage server 202 only needs to identify the location of the indirect data-block, but does not have to specifically identify the location of the direct data-blocks (which would require a separate read operation). Instead, the storage server 202 simply reads a specific number of data blocks that are immediately contiguous with the identified indirect data-object, and therefore avoids the need of a second read operation.

The process explained in FIG. 7 refers to a generic process used by the storage server 202 to perform the concurrent single-read operation. In some instances, the storage server 202 performs such a read operation only after verifying whether the data object conforms to a contiguous-mode layout scheme. There are at least two techniques by which the storage server 202 verifies that the data object confirms to the contiguous mode layout scheme, which are explained in detail below with reference to FIGS. 8 and 9.

Figure 8:
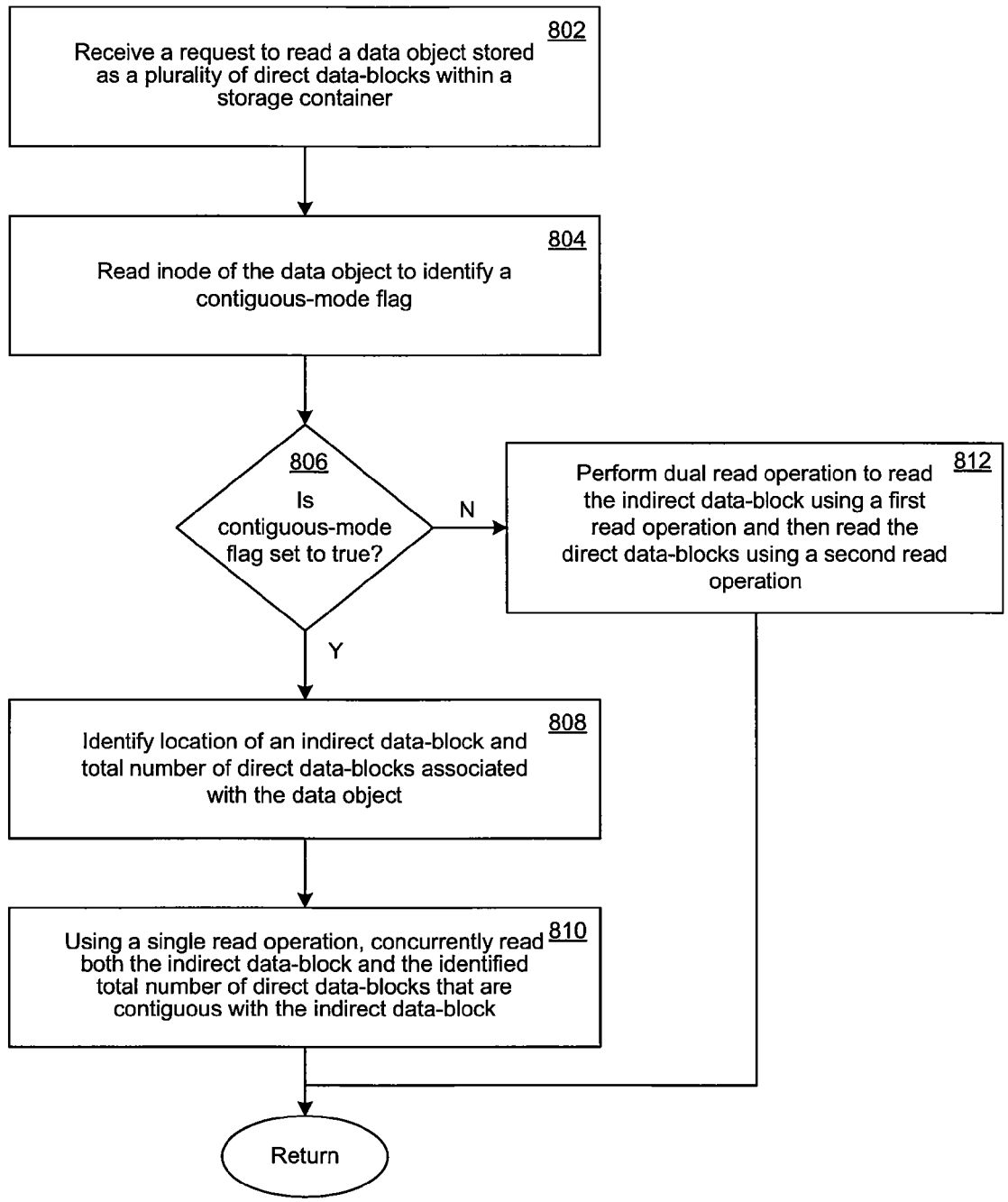
FIG. 8 is a flow diagram illustrating a process for performing a concurrent single-read operation on a data object that conforms to the contiguous-mode layout scheme.

Refer now to FIG. 8, which is a flow diagram illustrating a process for performing a concurrent single-read operation on a data object that conforms to the contiguous-mode layout scheme. At 802, the storage server 202 receives a request to read a data object. At 804, the storage server 202 reads an inode associated with the data object. In some instances, as illustrated in the example of FIG. 8, the concurrent single-read operation is performed on a data object only after verifying that the data object conforms to the contiguous-mode layout scheme. Accordingly, in one embodiment, the storage server 202 stores a flag (e.g., a logic bit) in association with the data object to indicate whether the data object conforms to the contiguous-mode layout scheme. The storage server 202 sets the flag at a first logic state (e.g., logic high) when the data object conforms to the contiguous-mode layout scheme, or at a second logic state (e.g., logic low) when the data object does not conform to the contiguous-mode layout scheme. In one embodiment, the storage server 202 includes such a flag within the inode of the data object.

Returning to FIG. 8, before reading the data object, the storage server 202 verifies whether the data object conforms to the contiguous-mode layout scheme by reading a contiguous-mode flag stored in the inode of the data object, as indicated in 804. If the contiguous-mode flag is set to true (i.e., if the data object conforms to the contiguous-mode layout scheme at 806), the process proceeds to 808, where the storage server 202 identifies a location of an indirect data-block associated with the data object and the total number of direct data-blocks associated with the data object. Using this information, the storage server 202 performs a concurrent single-read operation to read both the indirect data-block and the direct data-blocks that are located contiguous with the indirect data-block, as indicated in 810.

However, if (at 806) the storage server 202 determines that the continuous-mode flag is not set to true (i.e., the data object does not conform to the contiguous-mode layout scheme), the process branches to 812, where the storage server 202 performs a traditional dual read operation (i.e., uses a first read operation to read the indirect block(s) and then performs a second read operation to read the direct data-blocks referenced by the indirect data-block).

Figure 9:
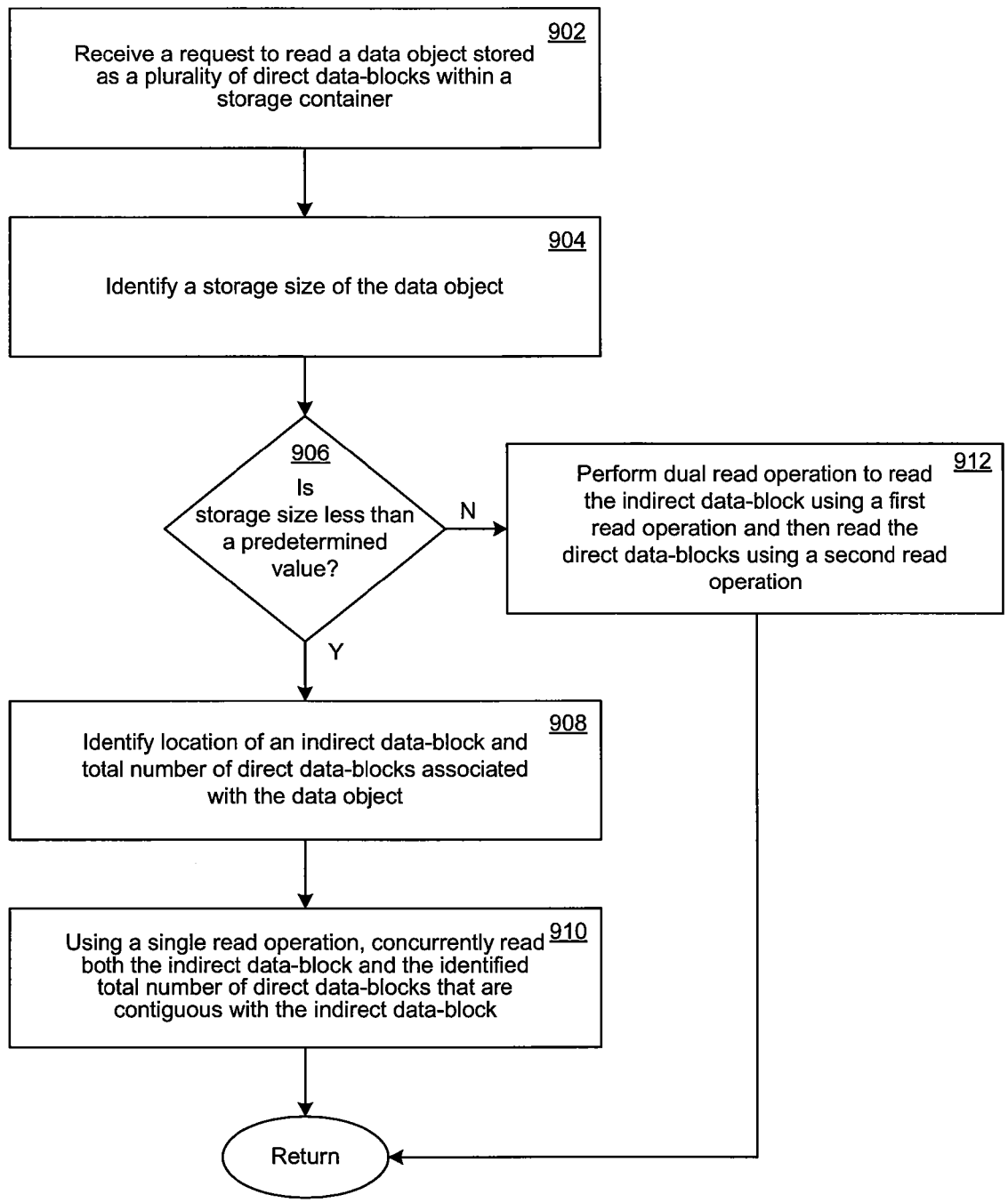
FIG. 9 is a flow diagram depicting another example of a process for performing the concurrent single-read operation.

FIG. 9 is a flow diagram depicting another example of a process for performing the concurrent single-read operation. At 902, the storage server 202 receives a request to read a data object. At 904, the storage server 202 identifies a storage size of the data object. In some instances, the storage server 202 identifies the storage size by reading an inode associated with the data object. At 906, the storage server 202 verifies whether the storage size of the data object is less than or equal to a storage-size limit that would allow the data object to conform to the contiguous-mode layout scheme (e.g., less than or equal to 256 KB for a WAFL® file system). If the storage size is less than or equal to a predetermined value (i.e., the storage-size limit), the process proceeds to 908, where the storage server 202 identifies a location of an indirect data-block of the data object and a number of direct data-blocks associated with the data object. Using this information, the storage server 202 performs a concurrent single-read operation to read both the indirect data-block and the direct data-blocks of the data object, as indicated in 910. However, if the storage size is greater than the predetermined value, the process shifts from 906 to 912, where the storage server 202 performs a traditional dual-read operation to read the data object.

Figure 10:
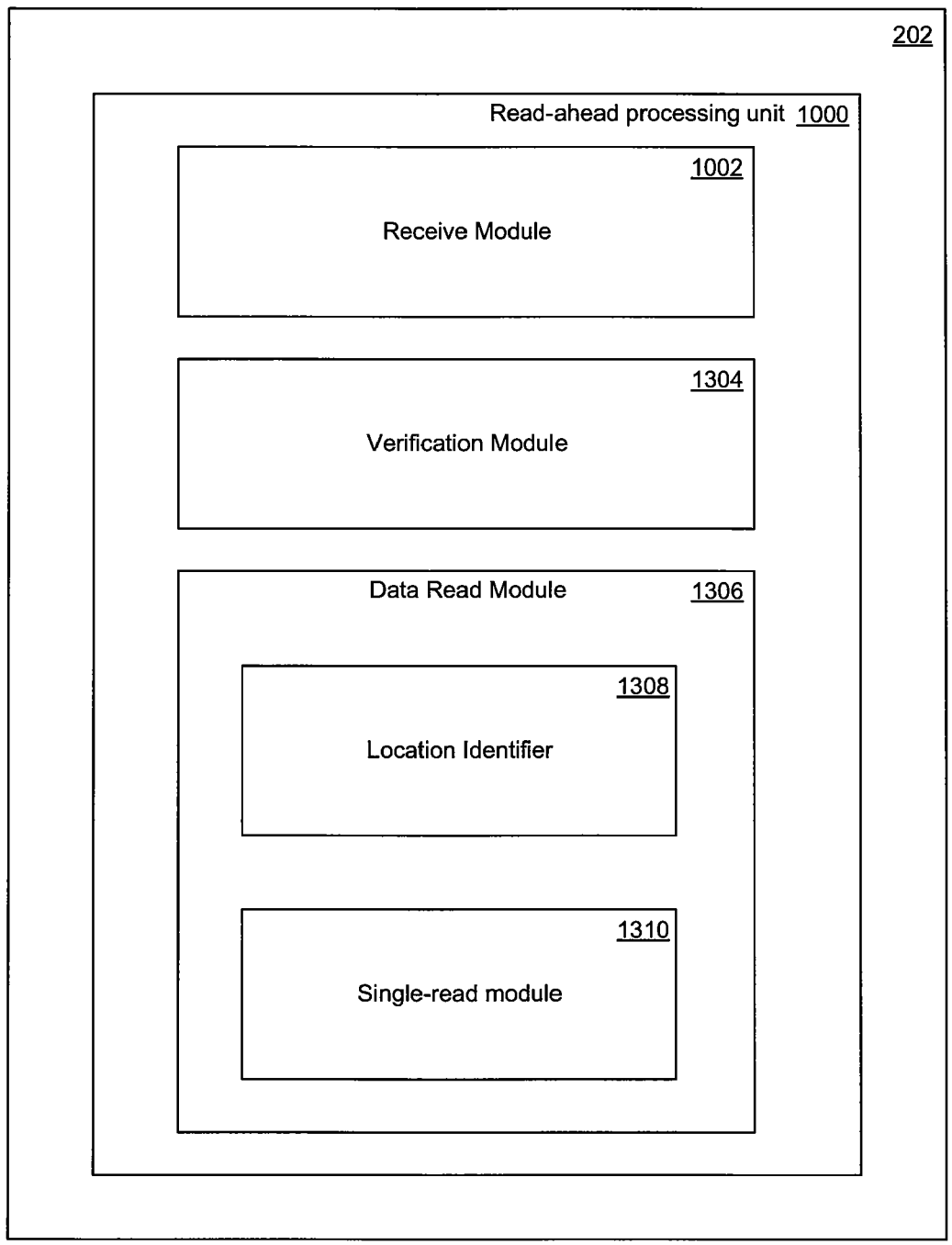
FIG. 10 is an exemplary architecture of a server system configured to transmit an object locator to read a data object using a concurrent single-read operation.

FIG. 10 is an example of an architecture of the server system 202 configured, for example, to read a data object using a concurrent single-read operation. In the illustrated example, the server system 202 includes a concurrent-read processing unit 1000 that performs various functions to perform the concurrent single-read operation. In some instances, the concurrent-read processing unit 1000 (and all of the elements included within the concurrent-read processing unit 1000) is implemented by using programmable circuitry programmed by software and/or firmware, or by using special-purpose hardwired circuitry, or by using a combination of such embodiments. In some instances, the concurrent-read processing unit 1000 is implemented as a unit in the processor 310 of the server system 202.

In the illustrated example, the concurrent-read processing unit 1000 includes a receive module 1002, a verification module 1004, and a data read module 1006. The receive module 1002 receives a request from, for example, a storage client, to read a data object. The receive module 1002 can be implemented within the N-module 214 of the storage server 202. The verification module 1004 is configured to determine whether the data object conforms to the contiguous-mode layout scheme. In one embodiment, the verification module 1004 analyzes a contiguous-mode flag included in the inode of the data object to determine whether the data object conforms to the contiguous-mode layout scheme. The verification module 1004 can be implemented within the D-module 216 of the storage-server.

The storage server 202 uses the data read module 1006 to read the data object form the storage container subsequent to verifying that the data object conforms to the contiguous-mode layout scheme. The data read module 1006 can be implemented within the D-module 216 of the storage server. The data read module 1006 includes a location identifier 1308 that reads the inode of the data object to identify a location of an indirect data-block of the data object. The data read module 1006 also includes a concurrent single-read module 1310 that is configured to read, using a concurrent single-read operation, both the identified indirect data-block and the multiple direct data-blocks that are located contiguous with the indirect data-block.

It is noted that in some instances, the direct data-blocks may not conform to the contiguous-mode layout scheme even if the size of the data object is under the predetermined limit (e.g., less than 256 KB). In such instances, if the verification module 1004 determines that the data object does not conform to the contiguous-mode layout scheme, the server system 202 proceeds to normal dual-read processing of the data object (i.e., the server system 202 reads the references included in the indirect data-block using a first read operation, and uses a second read operation to read the direct data-blocks).

The techniques introduced above can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method of operating a network storage server, the method comprising:
   receiving, at the network storage server, a request to read a data object, wherein the data object is stored at least partially as a plurality of direct data-blocks in a storage container of the network storage server;
   identifying, by the network storage server, a location of an indirect data-block of the data object and a total number of direct data-blocks associated with the data object, wherein the indirect data-block provides a reference to a location of each of the plurality of direct data-blocks within the storage container;
   identifying, by the network storage server, a storage size of the data object;
   determining that the identified storage size is less than a predefined storage-size limit, wherein the predefined storage-size limit corresponds to a maximum storage size associated with contiguous-mode data storage;
   identifying that the data object is stored in contiguous mode based on the determination that the identified storage size is less than the predefined storage-size limit; and
   subsequent to identifying that the data object is stored in contiguous mode based on the identified storage size, concurrently reading, by using a read operation, the indirect data-block of the data object and a specific number of data blocks that are located contiguous with the identified location of the indirect data-block, wherein the specific number is commensurate with the identified total number of direct data-blocks of the data object.

2. The method of claim 1, further comprising:
   using an inode associated with the data object to identify the location of the indirect data-block and the total number of direct data-blocks associated with the data object.

3. The method of claim 1, further comprising:
   performing, by the network storage server, the read operation only when a contiguous-mode condition is satisfied, wherein the contiguous-mode condition is satisfied when:
      the plurality of direct data-blocks are arranged sequentially within the storage container; and
      a location of a first direct data-block of the plurality of direct data-blocks is contiguous with the location of the indirect data-block within the storage container.

4. The method of claim 3, further comprising:
   reading, by the network storage server, a contiguous-mode flag stored in association with the data object to determine whether the contiguous-mode condition is satisfied, wherein the contiguous-mode flag indicates whether the contiguous-mode condition is satisfied.

5. The method of claim 4, wherein the contiguous-mode flag is stored in an inode associated with the data object.

6. The method of claim 3, further comprising:
   identifying that the contiguous-mode condition is satisfied when a size of the data object is less than a predetermined size.

7. A method of operating a network storage server, the method comprising:
   receiving, at the network storage server, a request to read a data object, wherein the data object is stored at least partially as a plurality of direct data-blocks in a storage container of the network storage server;
   verifying, by the network storage server, whether the data object satisfies a contiguous-mode condition, wherein the verifying includes:
      identifying, by the network storage server, a storage size of the data object:
         determining that the identified storage size is less than a predefined storage-size limit, wherein the predefined storage-size limit corresponds to a maximum storage size associated with contiguous-mode data storage:
         identifying that the data object is stored in contiguous mode based on the determination that the identified storage size is less than the predefined storage-size limit; and
   performing, by the network storage server, a read-ahead operation to read the data object when the data object satisfies the contiguous-mode condition, the read-ahead operation including:
      identifying a location of an indirect data-block associated with the data object and a total number of direct data-blocks of the data object, wherein the indirect data-block provides a reference to a location of each of the plurality of direct data-blocks; and
      using a read operation, concurrently reading the indirect data-block of the data object and a specific number of data-blocks that are located contiguous with the identified location of the indirect data-block, wherein the specific number is commensurate with the identified total number of direct data-blocks associated with the data object.

8. The method of claim 7, wherein the contiguous-mode condition is satisfied when:
   the plurality of direct data-blocks are arranged in successive physical addresses within the storage container; and
   a location of a first direct data-block of the plurality of direct data-blocks is contiguous with a location of the indirect data-block within the storage container.

9. The method of claim 7, wherein the step of verifying whether the data object satisfies a contiguous-mode condition further comprises:
   reading, by the network storage server, a contiguous-mode flag stored in association with the data object to determine whether the contiguous-mode condition is satisfied, wherein the contiguous-mode flag indicates whether the contiguous-mode condition is satisfied.

10. The method of claim 9, wherein the contiguous-mode flag is stored in an inode associated with the data object.

11. A network storage server system comprising:
   a processor;
   a network interface through which to communicate with a plurality of storage clients over a network;
   a storage interface through which to communicate with a nonvolatile mass storage subsystem; and
   a memory storing code which, when executed by the processor, causes the network storage server system to perform a plurality of operations, including:
      receiving a request to read a data object, wherein the data object is stored at least partially as a plurality of direct data-blocks in a storage container of the network storage server;
      identifying a location of an indirect data-block of the data object and a total number of direct data-blocks associated with the data object, wherein the indirect data-block provides a reference to a location of each of the plurality of direct data-blocks;
      identifying a storage size of the data object;
      determining that the identified storage size is less than a predefined storage-size limit, wherein the predefined storage-size limit corresponds to a maximum storage size associated with contiguous-mode data storage;

identifying that the data object is stored in contiguous mode based on the determination that the identified storage size is less than the predefined storage-size limit; and subsequent to identifying that the data object is stored in contiguous mode based on the identified storage size, using a read operation, concurrently reading both the indirect data-block associated with the data object and a specific number of data-blocks that are located contiguous with the identified location of the indirect data-block, wherein the specific number is commensurate with the identified total number of direct data-blocks associated with the data object.

12. The system of claim 11, wherein the plurality of operations further comprise:

using an inode associated with the data object to identify the location of the indirect data-block and the total number of direct data-blocks associated with the data object.

13. The system of claim 11, wherein the plurality of operations further comprises: performing the read operation only when a contiguous-mode condition is satisfied, wherein the contiguous-mode condition is satisfied when:

the plurality of direct data-blocks are arranged sequentially within the storage container; and a location of a first direct data-block of the plurality of direct data-blocks is contiguous with the location of the indirect data-block within the storage container.

14. The system of claim 13, wherein the plurality of operations further comprises: reading, by the network storage server, a contiguous-mode flag stored in association with the data object to determine whether the contiguous-mode condition is satisfied, wherein the contiguous-mode flag indicates whether the contiguous-mode condition is satisfied.

15. The system of claim 14, wherein the contiguous-mode flag is stored in an inode associated with the data object.

16. The system of claim 13, wherein the plurality of operations further comprises:

identifying that the contiguous-mode condition is satisfied when a size of the data object is less than a predetermined size.

* * * * *